(12) United States Patent
Cobb et al.

(10) Patent No.: US 8,526,008 B2
(45) Date of Patent: Sep. 3, 2013

(54) INTERFEROMETER WITH PARABOLOIDAL ILLUMINATION AND IMAGING OPTIC AND TILTED IMAGING PLANE

(75) Inventors: Joshua Monroe Cobb, Victor, NY (US); Thomas James Dunn, Penfield, NY (US); John Weston Frankovich, Fairport, NY (US)

(73) Assignee: Corning Incorporated, Corning, NY (US)

( * ) Notice: Subject to any disclaimer, the term of this patent is extended or adjusted under 35 U.S.C. 154(b) by 154 days.

(21) Appl. No.: 13/312,099

(22) Filed: Dec. 6, 2011

(65) Prior Publication Data

US 2012/0154819 A1   Jun. 21, 2012

Related U.S. Application Data

(63) Continuation of application No. 61/424,295, filed on Dec. 17, 2010.

(51) Int. Cl.
  *G01B 11/02* (2006.01)
(52) U.S. Cl.
  USPC .......................... 356/511; 356/513
(58) Field of Classification Search
  USPC ................................. 356/450–521
  See application file for complete search history.

(56) References Cited

U.S. PATENT DOCUMENTS

| | | | |
|---|---|---|---|
| 2,693,065 A | 11/1954 | Zobel et al. | |
| 5,268,742 A * | 12/1993 | Magner | 356/514 |
| 5,291,269 A | 3/1994 | Ledger | |
| 6,344,898 B1 * | 2/2002 | Gemma et al. | 356/513 |
| 7,289,222 B1 * | 10/2007 | Schuster | 356/495 |
| 7,440,114 B2 | 10/2008 | Klooster et al. | |
| 2006/0061773 A1 | 3/2006 | Lee et al. | |
| 2007/0133008 A1 * | 6/2007 | Klooster et al. | 356/512 |
| 2007/0133010 A1 * | 6/2007 | Klooster et al. | 356/512 |
| 2008/0174783 A1 * | 7/2008 | Mater | 356/511 |

FOREIGN PATENT DOCUMENTS

WO   2011032572   3/2011

OTHER PUBLICATIONS

Arguijo et al; "Exact Ray-Trace Beam for an Off-Axis Paraboloid Surface"; Applied Optics/ vol. 42, No. 16/ Jun. 1, 2003, p. 3284.
Malone et al; "Design of a Thermal Imaging Diagnostic Using 90-Degree, Off-Axis Parabolic Mirrors"; SPIE, vol. 6288, Jan. 1, 2006, p. 6288.
Zhao et al; "Figure Measurement of a Large Optical Flat With a Fizeau Interferometer and Stitching Technique"; SPIE, PO Box 10 Bellingham WA 98227-0010; vol. 6293, 2006.

* cited by examiner

*Primary Examiner* — Tarifur Chowdhury
*Assistant Examiner* — Michael P LaPage
(74) *Attorney, Agent, or Firm* — Timothy M. Schaeberle

(57) ABSTRACT

A Fizeau interferometer incorporates an off-axis paraboloidal reflector that forms virtual images of reference and test surfaces and a camera lens that converts the virtual images into real images on a camera detector surface. The camera detector surface is arranged together with the camera lens to accommodate tilting of the virtual images by the off-axis paraboloidal reflector.

20 Claims, 6 Drawing Sheets

INTERFEROMETER WITH PARABOLOIDAL ILLUMINATION AND IMAGING OPTIC AND TILTED IMAGING PLANE

This application claims the benefit of priority under 35 U.S.C. §119 of U.S. Provisional Application Ser. No. 61/424,295 filed on Dec. 17, 2010 the content of which is relied upon and incorporated herein by reference in its entirety.

TECHNICAL FIELD

The invention relates to interferometers, particularly Fizeau-type interferometers arranged for performing frequency-scanning interferometry and to the use of reflective optics within overlapping pathways for illuminating and imaging test objects.

BACKGROUND

Fizeau interferometers include a reference optic along the same optical pathway traveled by coherent light used for both illuminating and imaging a test object. A reference surface of the reference optic, generally referred to as a Fizeau surface, reflects a portion of the coherent light directed toward the test object as a reference beam and transmits another portion of the coherent light both to and from a test surface of the test object as an object beam.

The coherent light approaching the reference optic and test object is generally collimated, and in many Fizeau interferometers, the reference and test surfaces are oriented at least nominally normal to the approaching light for reflecting the light back towards its source. Unlike the reference surface, which is generally made both smooth and flat for retroreflecting light in the same collimated form at which the light approaches the reference surface, the test surface can be diffuse or include surface features as well as surface irregularities that are generally the subject of the measurement. Since the coherent light reflects from the test surface through a range of directions, an imaging system is used to collect the reflected light from both the reference and test surfaces. The imaging system images both surfaces onto a common imaging plane on which interference patterns form as a result of phase differences between the coherent light reflected from the reference and test surfaces.

These phase differences alone can be used to measure optical path length differences between the reference and test surfaces within an ambiguity interval of less than one wavelength of the coherent light. For measuring larger path length differences associated with test surfaces having larger features or irregularities, frequency shifting interferometers vary the frequency of the coherent light and monitor associated rates of change in phase to measure a much greater range of optical path differences between the reference and test surfaces. Since the test surfaces measurable by frequency scanning interferometers can include a much wider range of variation, greater demands are also placed on the imaging system to form aberration-free images of the test surfaces.

To accommodate the different depths at which the irregular features of test surfaces must be imaged without distortion, the imaging systems are generally arranged as telecentric imaging systems at least on the object side. Thus, the objective optics through which the reference and test surfaces are both illuminated and imaged must be larger than the field of view through which the measurements are taken. Conversely, the size of the objective optics determines the maximum size of the field of view subject to measurement. Considering that the field of view is generally set as large as practically possible to measure largest possible test objects or at least largest possible portions of even larger test objects, the objective optics themselves are often made as large as practically possible.

Most Fizeau interferometers include refractive objective optics located just in advance of the reference optic for both collimating the coherent light approaching the reference and test surfaces and for collecting and focusing the coherent light reflected from the reference and test surfaces through a telecentric stop. Given an ongoing demand for limiting aberrations, large objective optics tend to be difficult and expensive to manufacture and, as a matter of practicality, limited in size and weight.

The objective optics are also known to produce so-called "hot spots" near the optical axis where the objective optics themselves tend to retroreflect portions of the coherent light along the same path as the returning reference and object beams. The retroreflected light from the objective optics reduces phase contrast near the center of the image plane.

SUMMARY

An off-axis paraboloidal reflector, in accordance with preferred embodiments of this invention, functions as the objective of a Fizeau interferometer. The off-axis paraboloidal reflector is formed by a small section of a paraboloidal surface that is de-centered with respect to the paraboloidal axis. For purposes of illuminating reference and test surfaces with collimated light, a coherent light source can be located at the focal point of the off-axis paraboloidal reflector. The coherent light propagates through the focal point along a main optical axis to the off-axis paraboloidal reflector. The Fizeau reference surface, which receives the collimated light reflected by the off-axis paraboloidal reflector, is preferably oriented substantially normal to the collimated beam in a position that intersects a focal surface of the paraboloidal reflector. Light reflected from the reference and test surfaces is collected and imaged by the off-axis paraboloidal reflector forming overlapping virtual images of the reference and test surfaces. A camera lens converts the overlapping virtual images of the reference and test surfaces into real images on a camera detector surface.

The off-axis paraboloidal reflectors are much cheaper and easier to manufacture to desired size in comparison to conventional refractive objectives. Thus, the invention provides for measuring larger test objects or larger portions of even larger test objects.

While the off-axis paraboloidal reflector is ideal for collimating light originating from its on-axis focal point, the virtual images formed by the off-axis paraboloidal reflector are both tilted and distorted. The virtual images are tilted at a non-normal angle to the main optical axis and magnification varies with object point distance from the paraboloidal axis. The problems arise because the equivalent focal length of the paraboloid to each object point varies with the distance of the object point from the paraboloidal axis. The focal surface is itself is a section of a paraboloid sharing the same center of curvature as the paraboloidal surface. While the Fizeau reference surface can be located in a position that intersects the paraboloidal focal surface, the paraboloidal focal surface remains locally inclined to the Fizeau reference surface. The incline of the paraboloidal focal surface results in the overlapping virtual images of the reference and test surfaces being tilted, and thus there is a variation in focus with object point position. The variation in equivalent focal length varies the magnification of the object points within the tilted virtual images.

As generally preferred, the off-axis paraboloidal reflector focuses light through a telecentric stop to accommodate some variation in the separation between corresponding points on the reference and test surfaces. Each bundle of rays gathered from individual object points encounters a limited portion of the paraboloidal surface, which tends to limit wavefront aberrations. However, the virtual image remains tilted and distorted. The camera lens, as preferably arranged in accordance with the invention, converts the virtual images of the reference and test surfaces into real images on a camera detector surface having an optical orientation matching the optical orientation through which the virtual images are tilted.

For example, the camera detector surface can be tilted at a non-normal angle to the optical axis of the camera lens, which is coincident to the main optical axis of the illumination and imaging systems, for matching the non-normal angle through which the virtual images are tilted. Alternatively, a corrective optic can be incorporated into the camera lens matching the optical orientation of the camera detector surface to the optical orientation through which the virtual images are tilted. A wedge-type optic located in advance of the camera detector surface can be used for this purpose.

The remaining distortion can generally be corrected by field mapping. The difference between where an image point appears on the camera detector surface and where the image point should be if not distorted can be calculated in advance. Since the distortion can be predicted in advance, image points on the camera detector surface can be mapped to intended locations on the test surface. Even so, the distortion also has the effect of de-centering the image of the test surface on the camera detector surface. Points reproduced at a greater magnification require more space on the camera detector surface than points reproduced at a lesser magnification. The invention provides, as necessary, for the offset of a centerline through mechanical centers of the off-axis paraboloidal reflector and the Fizeau reference surface from the main optical axis. Thus, while the camera lens axis remains aligned with the main optical axis (albeit folded), the main optical axis extending between the off-axis paraboloidal reflector and the Fizeau reference surface is positioned closer to the paraboloidal axis than a centerline through the off-axis paraboloidal reflector and Fizeau reference surface.

One version of the invention as a Fizeau interferometer for measuring a test surface of an object features an off-axis paraboloidal reflector having a paraboloidal axis and a paraboloidal reflective surface that is offset from the paraboloidal axis. An effective light source is located with respect to the off-axis paraboloidal reflector so that coherent light emanating from the light source along a main optical axis to the off-axis paraboloidal reflector is collimated by reflection from the offset paraboloidal reflective surface. A Fizeau reference surface, which is oriented for receiving the collimated light at normal incidence, reflects a first portion of the light and transmits a second portion of the light to and from the test surface. The off-axis paraboloidal reflector forms overlapping virtual images of the reference and test surfaces, but the overlapping virtual images are tilted through a non-normal angle to the main optical axis. A camera lens converts the virtual images of the reference and test surfaces into real images on a camera detector surface having an optical orientation matching an optical orientation through which the virtual images are tilted.

To compensate for variation in magnification of corresponding points on the reference and test surfaces as imaged onto the camera detector surface, a processor maps image points on the camera detector surface to intended locations of the corresponding points on the reference and test surfaces. In addition, to compensate for the de-centering of the image of the reference and test surfaces on the camera detector surface, the centerline of the off-axis paraboloidal reflector and the Fizeau reference surface is offset from the main optical axis extending between the off-axis paraboloidal reflector and the Fizeau reference surface. While both (a) the centerline of the off-axis paraboloidal reflector and the Fizeau reference surface and (b) the main optical axis extending between the off-axis paraboloidal reflector and the Fizeau reference surface preferably extend parallel to the paraboloidal axis, the referenced centerline is preferably offset from the paraboloidal axis beyond the main optical axis.

A beam-splitting plate is preferably used for separating light propagating from the light source to the off-axis paraboloidal reflector from light propagating from the off-axis paraboloidal reflector to the camera lens. The preferred beam-splitting plate has a normal that is inclined to the optical axis of the imaging system and has a wedge angle between front and back surfaces that compensates for aberrations produced by propagation of the coherent light through the inclined plate.

For purposes of frequency-shifting interferometry, the coherent light source is preferably arranged for emitting a succession of different frequency light beams. The camera lens preferably captures a succession of different interference patterns. The processor preferably calculates rates of change in phase for a plurality of image points on the camera detector surface as measures of differences between the Fizeau reference surface and the test surface.

Another version of the invention as a method of measuring a test surface of an object with a Fizeau interferometer includes emitting coherent light from an effective light source, propagating the coherent light toward an off-axis paraboloidal reflector along a main optical axis, and reflecting the coherent light from an off-axis paraboloidal reflector toward a Fizeau reference surface as a collimated beam. A portion of the collimated beam reflects from the Fizeau reference surface and another portion of the collimated beam transmits through the Fizeau reference surface to and from the test surface. The light portions are collected by the off-axis paraboloidal reflector and reflected from the off-axis paraboloidal reflector for forming overlapping virtual images of the reference and test surfaces in an optical orientation that is tilted through a non-normal angle with respect to the main optical axis. The virtual images of the reference and test surfaces are converted into real images on a camera detector surface having an optical orientation matching the optical orientation through which the virtual images are tilted. An interference pattern formed by the real images of the reference and test surfaces is monitored for measuring differences between the reference and test surfaces.

A succession of different frequency light beams is preferably emitted from the effective light source and a succession of different interference patterns is monitored. Rates of change in phase are preferably calculated for a plurality of image points within the image field plane as measures of differences between the Fizeau reference surface and the test surface.

BRIEF DESCRIPTION OF THE DRAWING FIGURES

FIG. 1A is an enlargement along the main optical axis of the illumination and imaging systems showing an offset of component centerlines.

DETAILED DESCRIPTION

Figure 1:
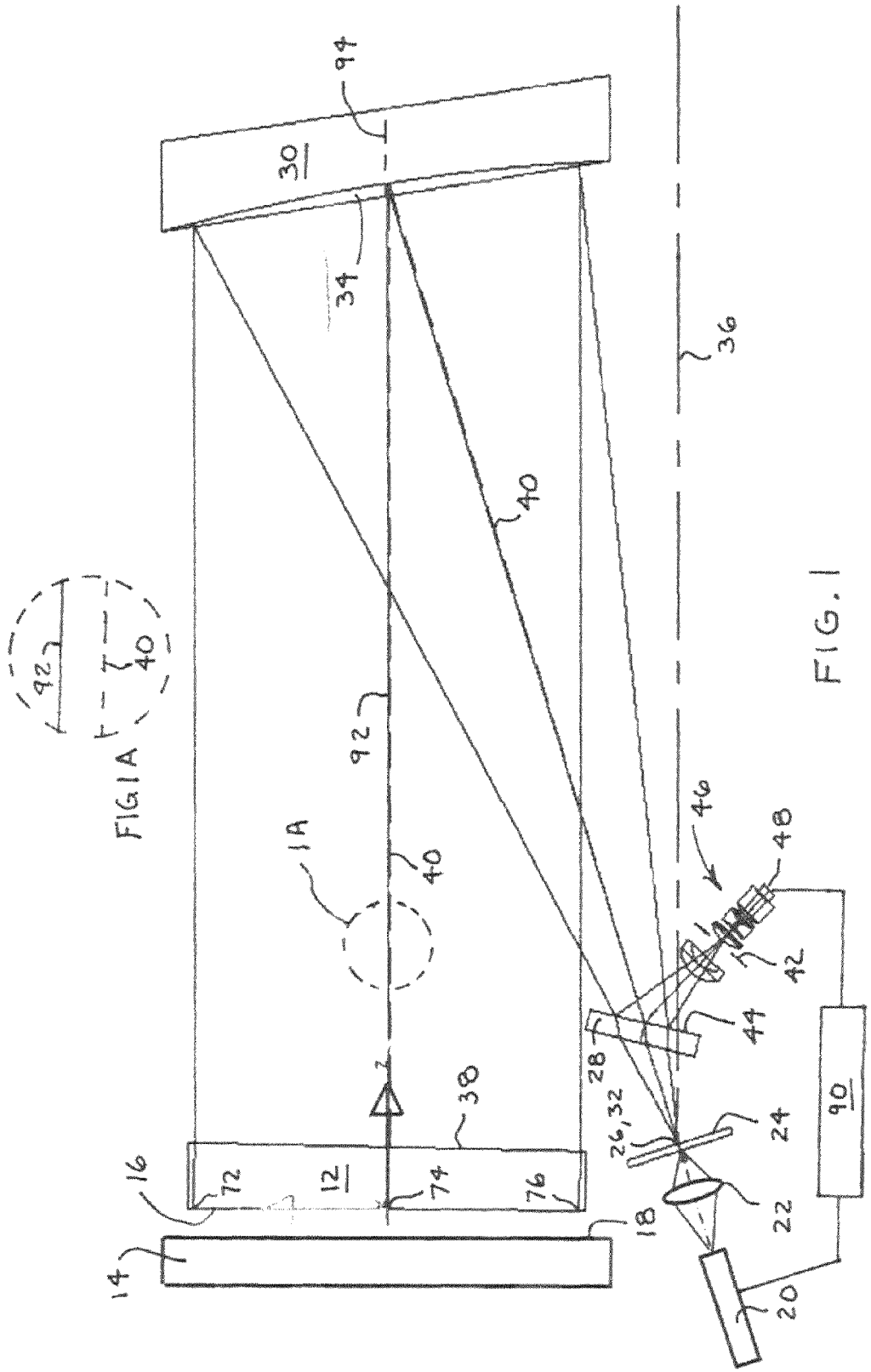
FIG. 1 is a diagram of a Fizeau interferometer arranged in accordance with the invention and having an off-axis paraboloidal reflector that functions both as a collimator for an illumination system and an objective of an imaging system.

A Fizeau interferometer 10 as shown in FIG. 1 is arranged in accordance with a preferred embodiment of the invention. For purposes of illuminating both a Fizeau reference optic 12 and a test object 14 with coherent collimated light, a light source 20, such as a laser diode, emits a coherent beam of light, which is collected and focused by a lens 22 onto a rotating diffuser 24. The light pattern emitted from the rotating diffuser 24 functions as an effective light source 26 having a spatially limited coherence for avoiding undesirable interference effects (often referred to as speckle) within the interferometer 10.

Light emanating from the effective light source 26 transmits through a beamsplitter plate 28 along a main optical axis 40 to an off-axis paraboloidal reflector 30. The effective light source 26 is located at the focal point 32 of the off-axis paraboloidal reflector 30 as apparent through the beamsplitter plate 28. The off-axis paraboloidal reflector 30 has a reflective paraboloid surface 34 corresponding to a small section of paraboloid that is de-centered with respect to a paraboloidal axis 36 of the paraboloid. The focal point 32 of the off-axis paraboloidal reflector is located along the paraboloidal axis 36.

The off-axis paraboloidal reflector 30 reflects the light received from the effective light source 26 along another section of the main optical axis 40 as collimated light, propagating toward the Fizeau reference optic 12 in a direction parallel to the paraboloidal axis 36. The Fizeau reference optic 12 is formed as a slight wedge having an entrance surface 38 that is tilted at a non-normal angle to the collimated light propagating along the main optical axis 40. The tilted entrance surface 38 avoids reflecting light in a direction that would contribute unwanted interference effects. The Fizeau reference optic 12 also includes a Fizeau reference surface 16 for retroreflecting a portion of the collimated light as a reference beam. To accommodate the small wedge effects of the tilted entrance surface 38, the Fizeau reference optic 12 is also tilted by a small amount. For example, the Fizeau reference optic 12 can be made of fused silica in the form of a wedge with a center thickness of 50 millimeters (mm), with a wedge angle of approximately one degree, and with the Fizeau reference optic 12 tilted by approximately 0.45 degrees out of normal to the main optical axis 40.

In addition to retroreflecting a portion of the collimated light as the reference beam, the Fizeau reference optic 12 transmits another portion of the light to and from the test object 14 as a test beam. Although shown spaced apart from the Fizeau reference optic 12, the test object 14 has a test surface 18 that is preferably mounted as close as possible to the Fizeau reference surface 16 and nominally parallel to the Fizeau reference surface 16 so that light retroreflected by the test surface 18 returns along the same path as collimated light retroreflected from the Fizeau reference surface 16.

For measuring test surface departures from the Fizeau reference surface including non-specular test surfaces, light reflected from the test surface 18 is collected over a range of reflected angles by the off-axis paraboloidal reflector 30 for forming overlapping virtual images of the reference and test surfaces 16 and 18. The range of angles over which the light is collected is limited by a telecentric stop 42 in a position that is optically conjugate to the effective light source 26. A front surface 44 of the beamsplitter plate 28 reflects the returning light (i.e., the reference and test beams) toward the telecentric stop 42 through which a camera lens 46 converts the virtual images into real images on a camera detector surface 48. As such, the beamsplitter plate 28 spatially separates the telecentric stop 42 from the effective light source 26.

As an inclined plate within a diverging beam, the beamsplitter plate 28 would be expected to introduce aberrations into the diverging beam approaching the off-axis paraboloidal reflector 30, which would adversely affect the desired collimation of the light approaching the reference and test surfaces 16 and 18. Both astigmatism and coma are among the expected effects. However, the beamsplitter plate 28 is preferably formed with a slight wedge angle, which is related to the thickness, tilt, and refractive index of the beamsplitter plate 28 to compensate for the expected aberrational effects.

Figure 2:
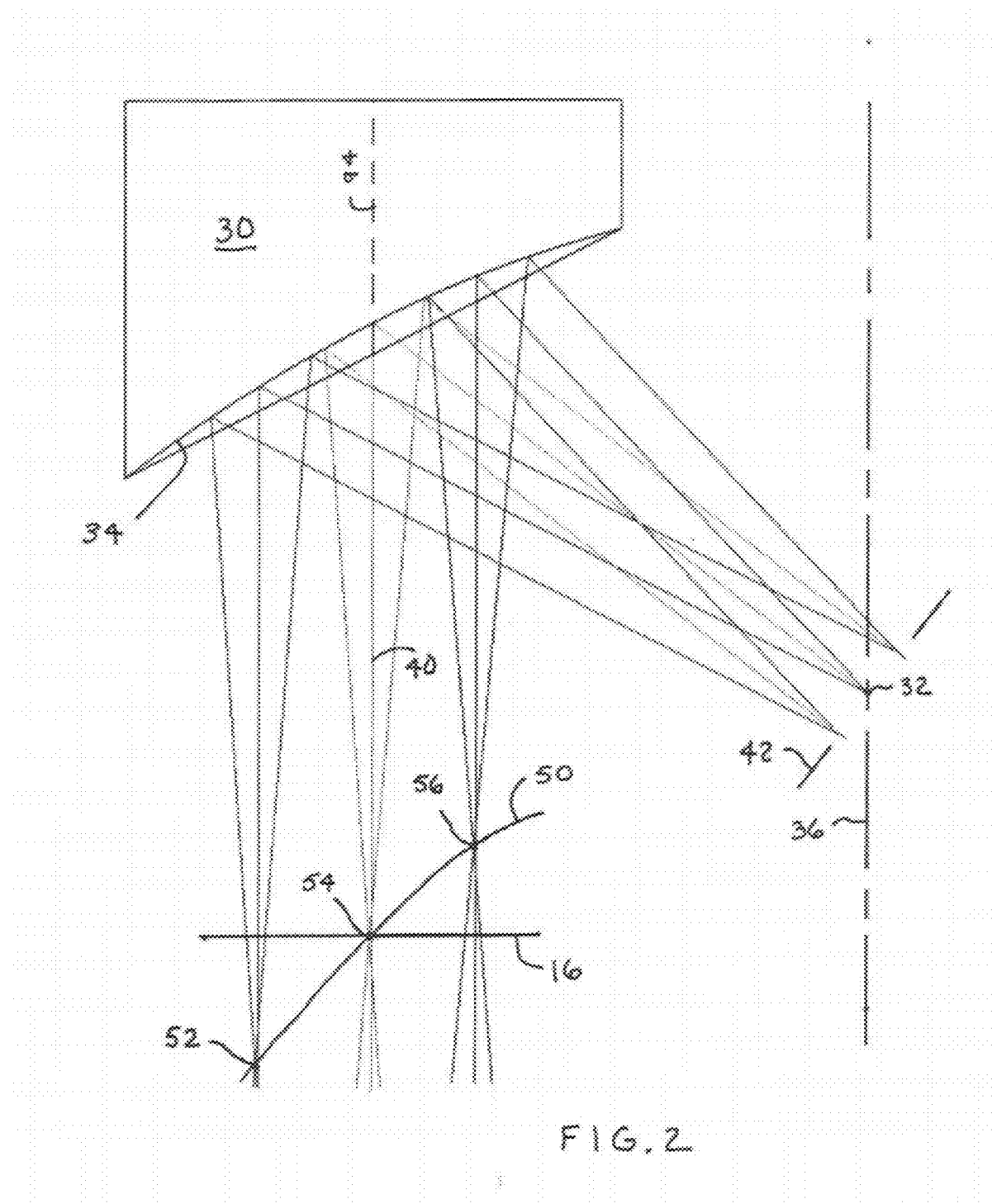
FIG. 2 is a diagram showing ray paths to and from the off-axis paraboloidal reflector for exaggerating a focal length shift with distance from a paraboloidal axis.

The off-axis paraboloidal reflector 30, while ideal for collimating light originating at its focal point 32, is less than ideal for imaging purposes. As shown exaggerated in FIG. 2, light beams centered at the focal point 32 and collimated through different angles are brought to focus by the off-axis paraboloidal reflector 30 at varying focal lengths to equivalent focal points 52, 54, and 56 that lie on a focal surface 50 in the form of a paraboloid having a center of curvature in common with the center of curvature of the reflective paraboloid surface 34 of the off-axis paraboloidal reflector 30.

Preferably, the Fizeau reference surface 16 intersects the focal surface 50 but remains oriented substantially normal to the main optical axis 40, which results in the focal surface 50 being locally tilted with respect to the Fizeau reference surface 16. For example, equivalent focal point 52, which lies in object space more remote from the paraboloidal axis 36 than the main optical axis 40, is located beyond the Fizeau reference surface 16, and equivalent focal point 56, which lies in object space less remote from the paraboloidal axis 36 than the main optical axis 40, is located in advance of the Fizeau reference surface 16.

Figure 3:
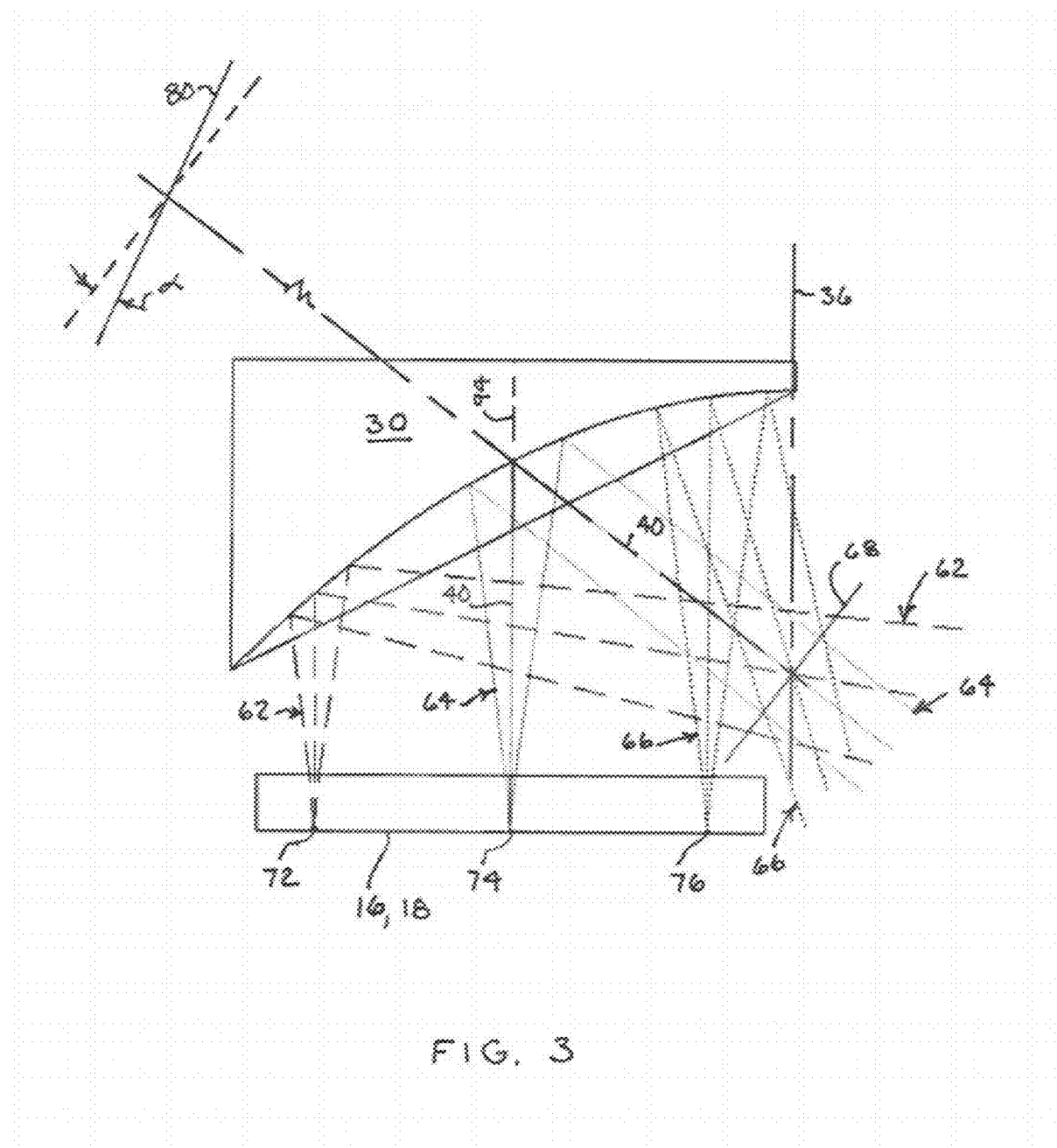
FIG. 3 is another diagram showing ray paths to and from the off-axis paraboloidal reflector differently exaggerated to show the expected tilt of a virtual image formed by the off-axis paraboloidal reflector.

FIG. 3, which also depicts an exaggerated form of the off-axis paraboloidal reflector 30, shows the propagation of ray bundles 62, 64, and 66 from respective object points 72, 74, and 76 from coincidental portions of the reference and test surfaces 16 and 18. The ray bundle 64 from the on-axis object point 74 returns as collimated light to an effective aperture plane 68. However, the ray bundle 62, which emerges from the object point 72 more remote from the paraboloidal axis 36, returns as a diverging beam, and the ray bundle 66, which emerges from the object point 76 less remote to the paraboloidal axis 36, returns as a converging beam. As a result, overlapping virtual images 80 of the reference and test surfaces 16 and 18, which might be seen through an eyepiece coupled to the aperture plane 68, lies tilted at a non-normal angle to the main optical axis 40 (i.e., deviates from normal through angle α).

Figure 4:
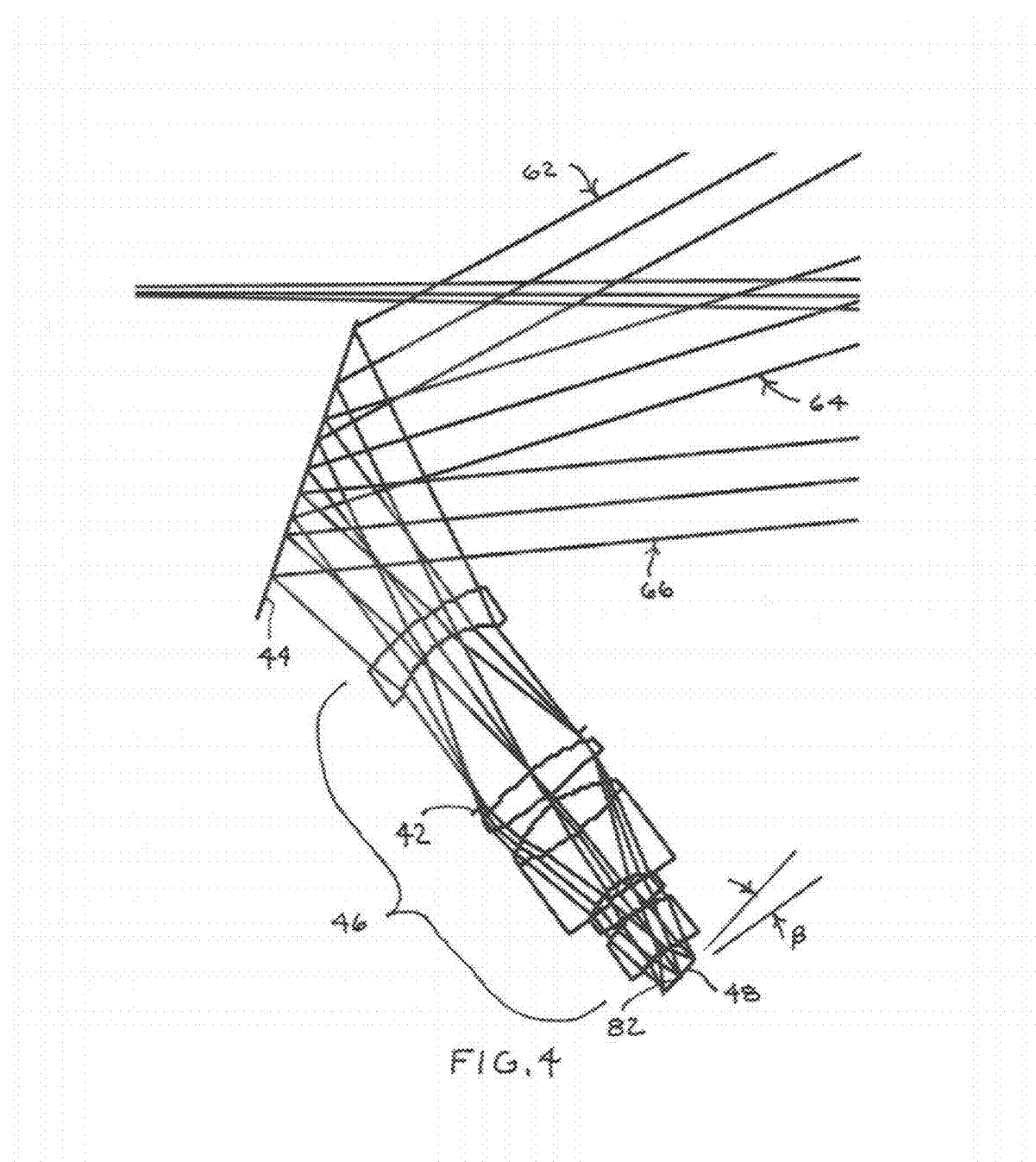
FIG. 4 is a relatively enlarged portion of the Fizeau interferometer showing a camera lens for converting the virtual image into a real image that is similarly tilted.

The camera lens 46, which is shown relatively enlarged in FIG. 4, converts the overlapping virtual images 80 into real images 82 on the camera detector surface 48. The tilt of the virtual images 80 propagates through the camera lens 46 so the camera detector surface 48 is correspondingly tilted (e.g., through angle β measured from normal) to better capture the real images 82. The angles α and β through which the virtual images 80 and camera detector surface 48 are tilted do not necessarily match each other but are related to that the real images 82 lie on the camera detector surface 48.

Figure 5:
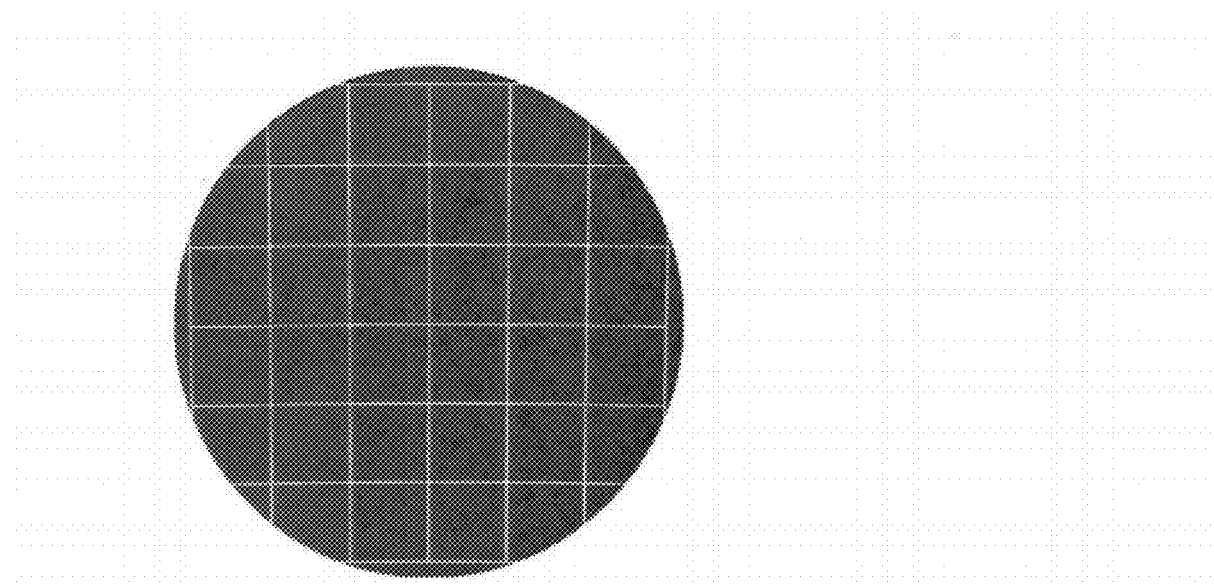
FIG. 5 is a field aperture grid for depicting distortion associated with the participation of off-axis paraboloidal reflector with imaging.
Figure 6:
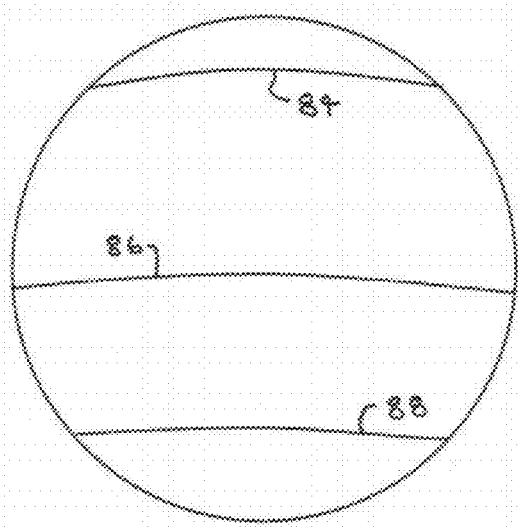
FIG. 6 depicts the same field aperture grid with three horizontal lines whose spacing corresponds to overlapping points on the reference and test surfaces 16 and 18 that are equally spaced in the vertical direction.
Figure 7:
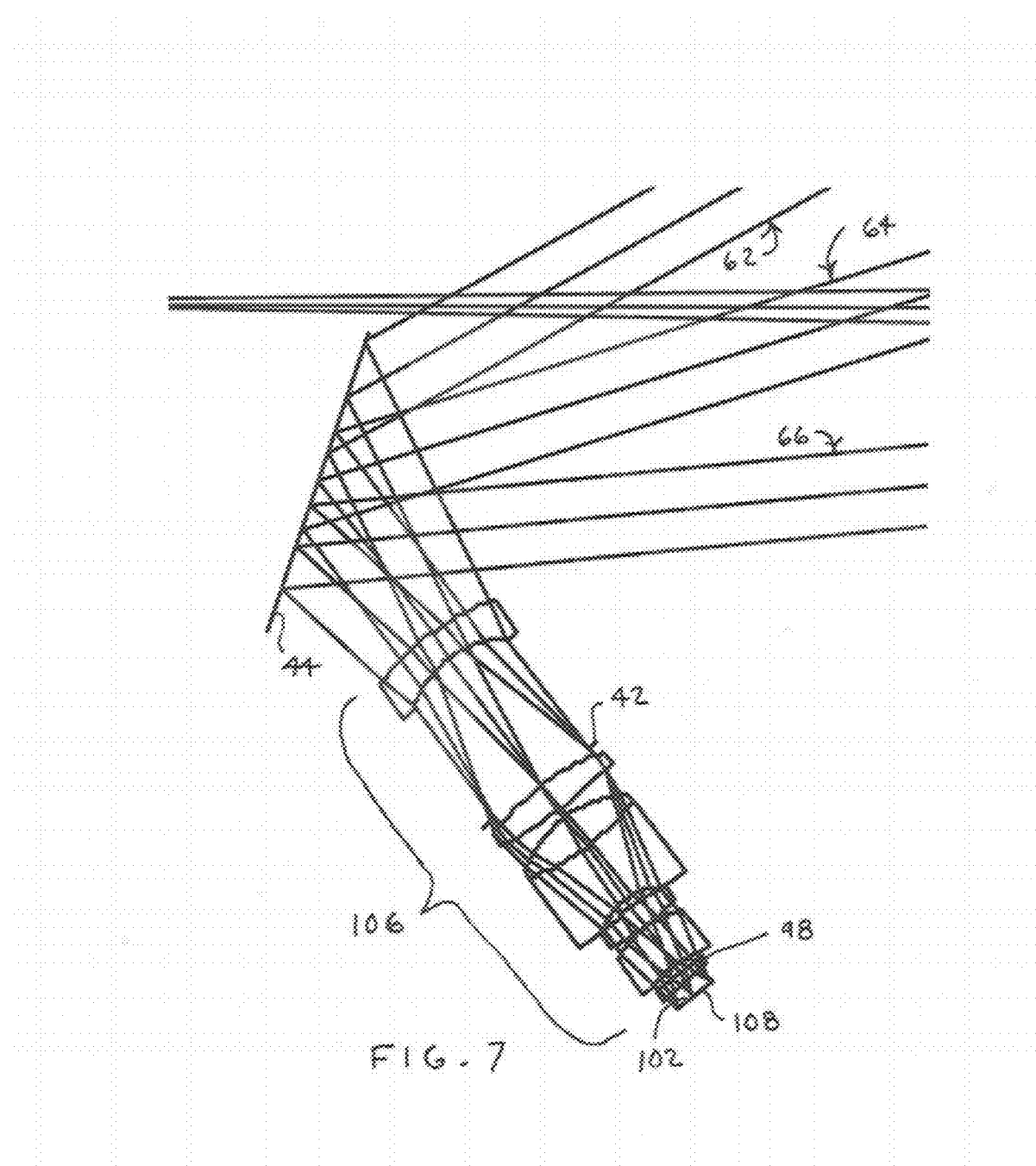
FIG. 7 is a diagram similar to FIG. 4 but depicting an alternative camera lens containing a corrective optic for matching the orientation of the virtual image to a camera detector surface oriented normal to the optical axis.

In addition to tilting the virtual and real images 80 and 82 the off-axis paraboloidal reflector 30 also distorts both sets of images 80 and 82. The equivalent focal lengths of the off-axis paraboloidal reflector 30, which vary with the distance of the object points 72, 74, and 76 from the paraboloidal axis 36, produce corresponding changes in magnification across the tilted camera detector surface 48. The changes in magnification, which are collectively referred to as distortion, are depicted by FIG. 5 in the form of a grid, where departures from orthogonality are indications of distortion. The distortion is largely manifest in the vertical direction of the grid, which corresponds to the direction in which the object points progressively depart from the paraboloidal axis 36. FIG. 6 shows three horizontal lines 84, 86, and 88 within the field aperture depicting equally vertically spaced points on the reference and test surfaces 16 and 18.

A processor 90, as shown in FIG. 1, receives information (e.g., relative light intensities from the camera detector surface 48) and processes the relative light intensities as interference images for converting the images into measures of optical path length differences, such as height variations, between the reference and test surfaces 16 and 18. The processor 90 is also connected to the light source 20 to coordinate variations in beam frequency with the processing of the interference patterns for measuring a larger range of differences (e.g., height differences) between the reference and test surfaces 16 and 18. For example, the processor 90 converts local light intensities of individual image points into measures of angular phase within an interference cycle (e.g., from zero to 2π) and also converts rates of change in the local phase with the rate of variation in beam frequency to resolve modulo 2π differences in phase that span more than one cycle of interference (e.g., multiples of 2π phase difference). U.S. Pat. No. 7,268,889 to Kulawiec et al., which is hereby incorporated by reference, describes an example of frequency-shifting interferometry in more detail.

With the distortion imparted by the off-axis paraboloidal reflector already known, the processor 90 also maps image points on the camera detector surface 48 to their corresponding locations on the test surface 18. As such, topographical maps of the test surface 18 can be presented without any of the distortion otherwise apparent on the camera detector surface 48.

The distortion also has the effect of de-centering the reference and test surfaces 16 and 18 on the camera detector surface 48. The more magnified portions of the reference and test surfaces take up more space on the camera detector surface 48 than the unmagnified portions. For re-centering the reference and test surfaces 16 and 18 on the camera detector surface 48, a centerline 92 of the reference surface 16 is correspondingly de-centered with respect to the main optical axis 40. A centerline 94 of the reflective paraboloid surface 34 is similarly de-centered with respect to the main optical axis 40. Both centerlines 92 and 94 are preferably displaced by the same amount with respect to the main optical axis 40 in a direction away from the paraboloidal axis 36. FIG. 1A is an enlargement along the main optical axis 40 more clearly showing the offset of the centerline 92 of the reference surface 16.

The aperture 42, particularly as referenced in FIG. 1, is preferably positioned as a telecentric stop for collecting light from the reference and test surfaces 16 and 18. The chief rays of all three object points 72, 74, and 76 pass through the center of the aperture stop 42—a position optically conjugate to both the effective light source 26 and the focal point 32 of the off-axis paraboloidal reflector 30. The range of collected angles within the corresponding bundles 62, 64, and 66 is preferably limited so that each bundle encounters only a limited portion of the reflective paraboloid surface 34. As such, any departure of the individual limited portions of the reflective paraboloid surface 34 from a circular form is limited. Wavefront aberrations, particularly coma and astigmatism, are also correspondingly limited.

The off-axis paraboloidal reflector 30 is preferably formed with a diamond-turned, reflective paraboloid surface 34 having specifications as set forth in the table below.

| Off-Axis Paraboloid Definition | |
| --- | --- |
| Field size radius | 155 mm |
| Parabola radius | 1562 mm |
| Off axis | 235 mm |
| Parabola EFL | 781 mm |
| Offset from Fizeau center to OA | 2.24 mm |

A camera, such as a Dalsa Falcon 4M60, can be used to provide the camera detector surface 48. The camera lens 46 is preferably designed to image light through a higher numerical aperture than the light imaged by the reflective paraboloid surface 34 to accept a bow or tilt in a specular part.

In place of tilting the camera detector surface 48 as shown in FIG. 4 to compensate for the tilted virtual image 80, a corrective optic 98 can be incorporated into a modified camera lens 106 to reorient a real image 102 on a camera detector surface 108 that is oriented normal to the main optical axis 40. The corrective optic 98, which is preferably positioned adjacent to the camera detector surface 108, preferably has the overall form of a wedge for orienting the real image 102 normal to the main optical axis 40. In the form of a wedge, the corrective optic 98 can have planar front and back surfaces oriented through a wedge angle for varying optical path lengths across the image field so that image points focus on a common image plane oriented normal to the main optical axis and coincident with the camera detector surface 108.

Preferably, the light for both illuminating and imaging the reference and test surfaces 16 and 18 propagates along the same main optical axis 40, although individual components can be de-centered with respect to this axis 40 to accommodate the distortion produced by the off-axis paraboloidal reflector 30. In fact, the off-axis paraboloidal reflector 30 is preferably de-centered together with the reference and test surfaces 16 and 18 so that a boundary of the light through which the reference and test surfaces 16 and 18 are both illuminated and imaged is approximately centered with respect to the main optical axis 40.

The nominal wavelength of the light emitted by the light source 20 can be selected in accordance with the requirements of the measurement, but is preferably in the near infrared range, where possible, to lower cost but can easily be extended into the visible range. A nominal wavelength of 830 nanometers (nm) is assumed for the above examples.

Although described with respect to particular embodiments, those of skill in the art will appreciate the wide variation through which the invention can be implemented in accordance with the overall teaching of the invention.

The invention claimed is:

1. A Fizeau interferometer for measuring a test surface of an object comprising:
   an off-axis paraboloidal reflector having a paraboloidal axis and a paraboloidal reflective surface that is offset from the paraboloidal axis;
   an effective light source located with respect to the off-axis paraboloidal reflector so that coherent light emanating from the light source along a main optical axis to the off-axis paraboloidal reflector is collimated by reflection from the offset paraboloidal reflective surface;
   a Fizeau reference surface oriented for receiving the collimated light at normal incidence, reflecting a first portion of the light, and transmitting a second portion of the light to and from the test surface;
   the off-axis paraboloidal reflector being arranged for forming overlapping virtual images of the of the reference and test surfaces, the overlapping virtual images being tilted through a non-normal angle to the main optical axis; and
   a camera detector surface together with a camera lens for converting the virtual images of the reference and test surfaces into real images on the camera detector surface having an optical orientation matching an optical orientation through which the virtual images are tilted.

2. The interferometer of claim 1 in which the camera lens has an optical axis, and the camera detector surface is tilted at a non-normal angle to the optical axis of the camera lens for matching the non-normal angle through which the virtual images are tilted.

3. The interferometer of claim 1 in which the camera lens includes a corrective optic for matching the optical orientation of the camera detector surface to the optical orientation through which the virtual images are tilted.

4. The interferometer of claim 3 in which the corrective optic is an optical wedge.

5. The interferometer of claim 1 in which magnification of corresponding points on the reference and test surfaces as imaged onto the camera detector surface varies with offset of the corresponding points from the paraboloidal axis and further comprising a processor for mapping image points on the camera detector surface to intended locations of the corresponding points on the reference and test surfaces.

6. The interferometer of claim 1 in which a centerline through the offset paraboloidal reflector and the Fizeau reference surface is offset beyond the main optical axis extending between the offset paraboloidal reflector and the Fizeau reference surface for centering the real images of the reference and test surfaces on the camera detector surface.

7. The interferometer of claim 1 in which the off-axis paraboloidal reflector reflects the light from the reference and test surfaces through a telecentric stop that is conjugate to the effective light source.

8. The interferometer of claim 1 in which off-axis paraboloidal reflector has a focal surface shaped as a section of a paraboloid, and the Fizeau reference surface intersects the focal surface of the off-axis paraboloidal reflector so that a portion of the reference surface is located on one side of the focal surface and another portion of the reference surface is located on an opposite side of the focal surface.

9. The interferometer of claim 1 including a beam-splitting plate for separating light propagating from the effective light source to the off-axis paraboloidal reflector from light propagating from the off-axis paraboloidal reflector to the camera lens.

10. The interferometer of claim 9 in which the beam-splitting plate has a normal that is inclined to the main optical axis and a wedge angle between front and back surfaces that compensates for aberrations produced by propagation of the coherent light through the inclined beam-splitting plate.

11. The interferometer of claim 1 in which the effective light source is arranged for emitting a succession of different frequency light beams, the camera lens is arranged for capturing a succession of different interference patterns, and a processor provides for calculating rates of change in phase for a plurality of image points on the camera detector surface as measures of differences between the Fizeau reference surface and the test surface.

12. A method of measuring a test surface of an object with a Fizeau interferometer comprising:
   emitting coherent light from an effective light source;
   propagating the coherent light toward an off-axis paraboloidal reflector along a main optical axis;
   reflecting the coherent light from the off-axis paraboloidal reflector toward a Fizeau reference surface as a collimated beam;
   reflecting a portion of the collimated beam from the Fizeau reference surface and transmitting another portion of the collimated beam to and from the test surface;
   collecting the light portions from the reference and test surfaces with the off-axis paraboloidal reflector and reflecting the collected light portions from the off-axis paraboloidal reflector to form overlapping virtual images of the reference and test surfaces in an optical orientation that is tilted through a non-normal angle with respect to the main optical axis;
   converting the virtual images of the reference and test surfaces into real images on a camera detector surface having an optical orientation matching the optical orientation through which the virtual images are tilted; and
   monitoring an interference pattern formed by the real images of the reference and test surfaces for measuring differences between the reference and test surfaces.

13. The method of claim 12 in which the step of emitting includes emitting the coherent light through a focal point of the off-axis paraboloidal reflector for collimating the coherent light reflected from the off-axis paraboloidal reflector.

14. The method of claim 12 in which the step of converting the virtual images of the reference and test surfaces includes tilting the camera detector surface at a non-normal angle to an optical axis of the camera lens for matching the non-normal angle through which the virtual images are tilted.

15. The method of claim 12 in which the step of converting the virtual images of the reference and test surfaces includes using a corrective optic for matching the optical orientation of the camera detector surface to the optical orientation through which the virtual images are tilted.

16. The method of claim 12 including a step of offsetting a centerline of the off-axis paraboloidal reflector and the Fizeau reference surface from the main optical axis extending between the off-axis paraboloidal reflector and the Fizeau reference surface.

17. The method of claim 12 including a step of locating the Fizeau reference surface in a position for intersecting a focal surface of the off-axis paraboloidal reflector such that a portion of the reference surface is located on one side of the focal surface and another portion of the reference surface is located on an opposite side of the focal surface.

18. The method of claim 12 in which magnification of points within an object field of the test surface varies with offset of the object points from the paraboloidal axis and including a step of mapping image points on the camera detector surface to intended locations on the test surface.

19. The method of claim 12 including a step of separating light propagating from the effective light source to the off-axis paraboloidal reflector from light propagating from the off-axis paraboloidal reflector to the camera lens with a beam-splitting plate having a normal that is inclined to the main optical axis and a wedge angle between front and back surfaces that compensates for aberrations produced by propagation of the coherent light through the inclined beam-splitting plate.

20. The method of claim 12 in which the step of emitting includes emitting a succession of different frequency light beams, the step of monitoring includes monitoring a succession of different interference patterns, and including a step of calculating rates of change in phase for a plurality of image points within the camera detector surface as measures of differences between the Fizeau reference surface and the test surface.

* * * * *